United States Patent
Fortune

[11] 3,726,603
[45] Apr. 10, 1973

[54] AUTOMATIC SYSTEM FOR TREATING ELONGATED STOCK

[76] Inventor: William S. Fortune, 14250 Dearborn St., Panorama City, Calif. 91402

[22] Filed: Aug. 3, 1971

[21] Appl. No.: 168,592

[52] U.S. Cl. ..........................408/40, 408/62, 408/68, 10/105, 90/24 C, 29/559, 214/95
[51] Int. Cl. ..............................................B23b 39/22
[58] Field of Search..................408/37, 62, 63, 64, 408/65, 66, 67, 68; 29/561, 563, 564, 565; 10/105; 90/24 A, 24 C

[56] References Cited

UNITED STATES PATENTS

| | | | |
|---|---|---|---|
| 2,004,540 | 6/1935 | Smith et al. | 408/67 |
| 2,956,453 | 10/1960 | Frankenfeld et al. | 408/40 |

*Primary Examiner*—Francis S. Husar
*Attorney*—Daniel T. Anderson

[57] ABSTRACT

A system for automatically treating elongated stock, such for example as tubes, rods, or bars. The stock is cut into predetermined length and then must be deburred, chamfered, drilled or counter-bored, as the case may be. The stock is held in a vise mounted on a vise platform and capable of reciprocating in one direction. The vise platform is slidably mounted on a main platform capable of reciprocating at right angles to the vise platform. The vise is opened to receive a piece of stock, and the stock is then moved into alignment with two opposed tools. The stock is then moved first against one rotating tool and then against the other for deburring it or else against a non-rotating tool for applying a cap or the like thereto. The finished tool is then moved to another station where it is ejected by an air nozzle. The platform may be rapidly moved by an air system. The movement may be slowed or retarded by an oil damping system including an adjustable metering valve. Bumpers may be provided for slowly moving each end of the stock against the appropriate rotating tool and again the movement may be controlled by adjustable valves. The stock is metered one by one into the vise by a fixed stock guide and a reciprocating stock releasing or metering device which is controlled by engagement with the moving platform for receiving the next piece of stock.

13 Claims, 11 Drawing Figures

PATENTED APR 10 1973 3,726,603
SHEET 1 OF 4
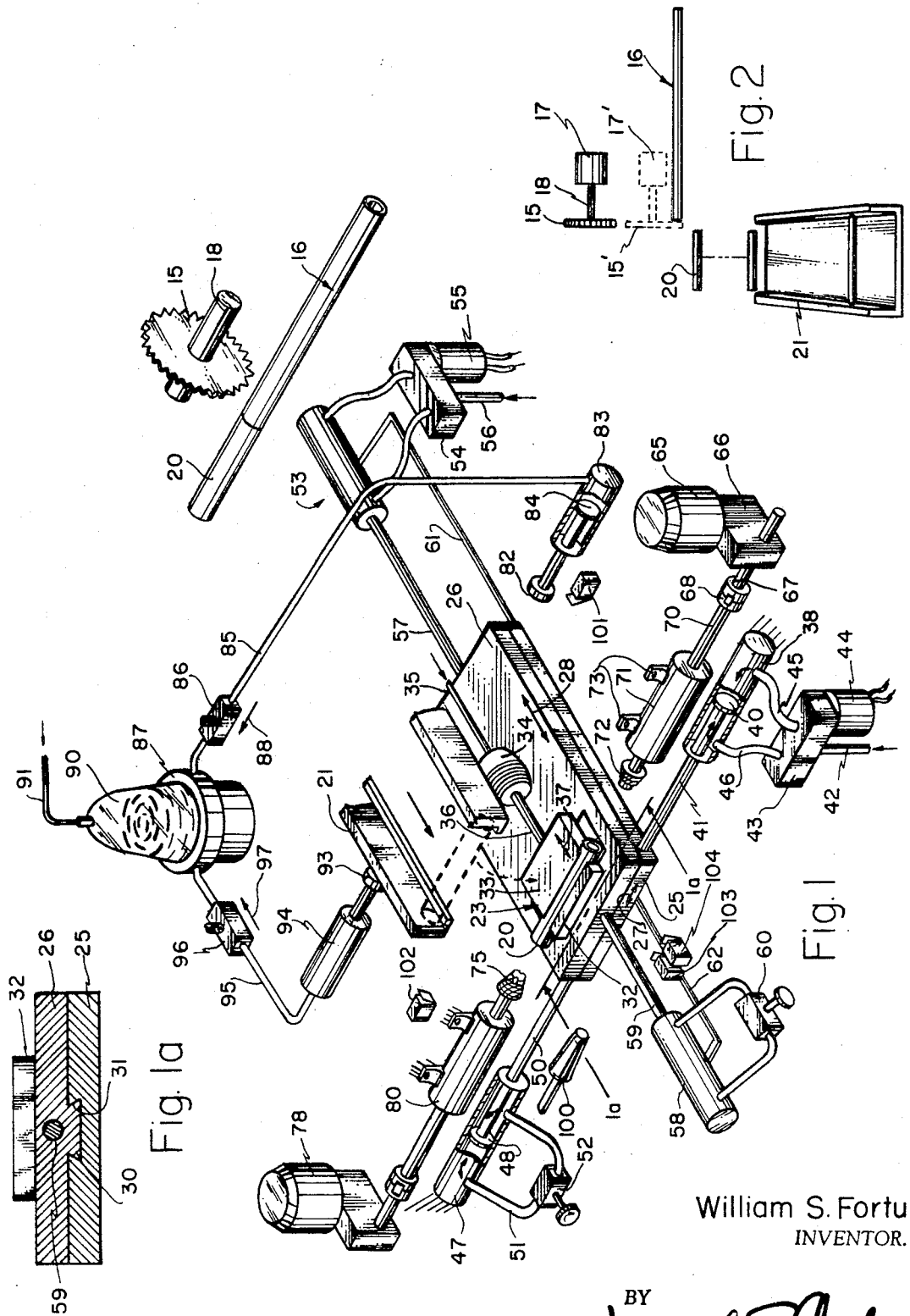
William S. Fortune
INVENTOR.
BY Daniel T. Anderson
ATTORNEY William S. Fortune
INVENTOR.

BY
Daniel T. Anderson
ATTORNEY

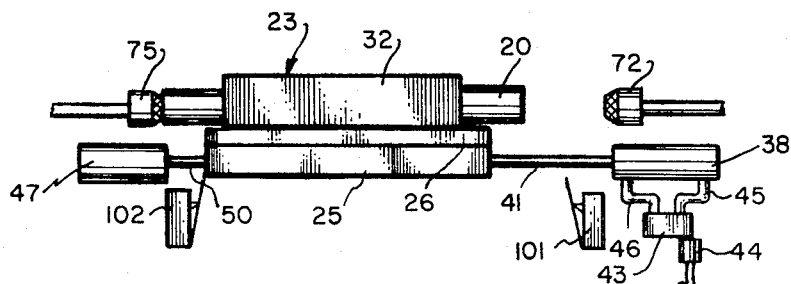
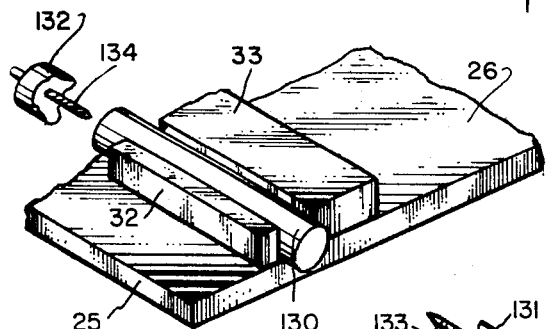
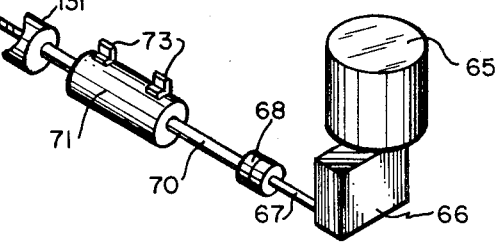

William S. Fortune
INVENTOR.

BY
Daniel T. Anderson
ATTORNEY

AUTOMATIC SYSTEM FOR TREATING ELONGATED STOCK

BACKGROUND OF THE INVENTION

1. FIELD OF THE INVENTION

It is conventional practice to cut elongated stock into suitable pieces, for example, by means of a rotary saw. The resulting pieces of stock of predetermined length now have inherently burrs and sharp, rough edges at the cut ends. This is the case whether the stock consists of tubing or of rods or bars.

In order to reduce hand labor it is extremely desirable to provide an automatic system for treating such precut lengths of stock. This problem becomes increasingly more acute with rising wages and other problems of labor all over the world. Hence, to remain competitive it is almost imperative to provide such an automatic system for treating tube or bar stock after it has been cut to desired length as by a rotating saw.

It is accordingly an object of the present invention to provide an automatic system for treating, one by one, pieces of stock cut to length by a rotary saw or the like.

Another object of the present invention is to provide in such an automatic system, mechanism for releasing, one by one, upon demand a cut length of the elongated stock for further treatment by the machine.

A further object of the invention is to provide platform means for rapidly moving each cut piece of stock held in a vise yet including means for slowing down the movement of the platform so as to avoid damage to the stock or the tools.

SUMMARY OF THE INVENTION

Briefly, these and other objects are achieved in accordance with the structural aspects of an example of the invention in which an automatic system for treating elongated stock comprises platform means. The platform is adapted to move in two directions at right angles to each other. A vise or clamp is provided for holding the stock. The vise is fixed to the platform means and is capable of opening and closing for releasing or holding successive pieces of stock. A mechanism is provided for feeding, one by one, a piece of the stock into the vise and for subsequently closing the vise.

A pair of tools is disposed opposite to each other and in the path of the movement of the platform means for engagement successively with either one of the ends of the stock. Means are provided for moving the platform means so that the stock engages in succession first one and then the other one of the tools. Finally, means are provided for ejecting the finished stock from the vise.

The mechanism for releasing the stock one by one may include a fixed stock guide as well as a reciprocating stock retaining mechanism cooperating with and controlled by movements of the vise for releasing at the end of each operating cycle a new piece of stock into the vise. All this takes place in real time while the uncut stock is advanced and another piece of stock is severed.

The novel that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a view in perspective of an example of an automatic system for treating elongated stock constructed in accordance with the principles of the invention, but for the sake of clarity omitting the stock metering mechanism;

FIG. 1a is a sectional view taken on line 1a — 1a of FIG. 1 and showing the main and vise platforms;

FIG. 2 is a front elevational view illustrating a reciprocating rotary saw for severing a piece from an elongated stock and dropping it into a stock retaining tray;

FIG. 6 is front elevational view illustrating the stock in the closed vise and in engagement with one of the two tools for deburring one end of the stock;

FIG. 7 is a front elevational view similar to that of FIG. 6 but illustrating the vise platform and stock in the opposite position with the other end of the stock being treated by the tool;

FIG. 9 is a perspective illustrating a length of bar stock being treated by a tool including a deburring tool and a drill.

DESCRIPTION OF THE PREFERRED EMBODIMENT

Figure 3:
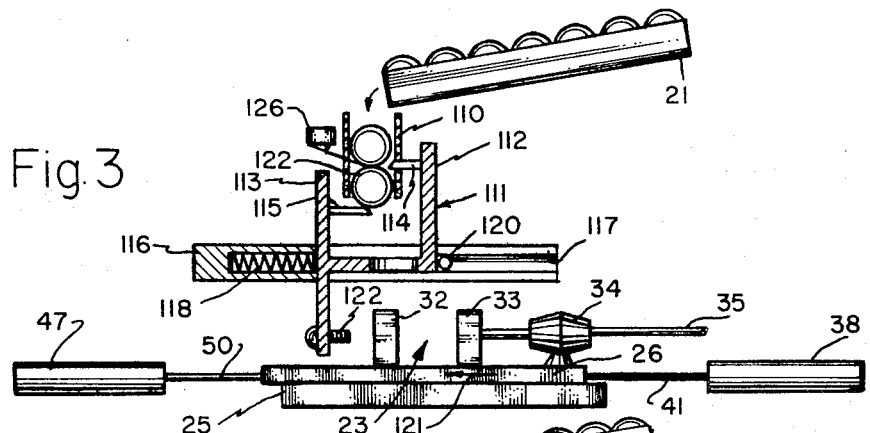
FIG. 3 is a side elevational view, partly in section, primarily of the stock metering mechanism with a cooperating open vise, vise platform and main platform and showing the vise moving into engagement with the stock releasing mechanism.

Referring now to the drawings, and particularly to FIG. 1, the example of the automatic stock treating system of the invention may include a rotary saw 15 for cutting off predetermined lengths of the elongated stock 16. As shown particularly in FIG. 2, the rotary saw 15 may be driven by an electric motor 17 through a shaft 18. The rotary saw 15 is normally in the position shown in FIG. 1 and shown in FIG. 2 in full lines. When the stock 16 has advanced by a predetermined amount in the lefthand direction, a piece of stock 20 is severed by the saw which is then moved into the dotted position 15' of FIG. 2. The stock 20 then drops into a stock retainer tray 21 which is positioned below the stock 16 to receive successive pieces of stock such as 20 as are being cut off. Several pieces of stock may be stored in the tube retainer tray 21 and may be fed or metered from the tray 21 into a vise 23 one by one after each cycle of operation is finished.

For the sake of clarity, the stock metering mechanism which supplies the stock to the vise 23 has not been illustrated in FIG. 1. However, this mechanism will subsequently be described in connection with FIGS. 3 to 5.

In the description of the automatic machine for treating the stock, it should be noted that for the example illustrated in FIG. 1 it will be assumed that the stock 16 consists of a tube. However, it is to be understood that instead of a tube the stock may consist of rods or bars, as will be subsequently shown in connection with FIG. 9.

The apparatus shown in FIG. 1 includes a main platform 25 and a vise platform 26. The main platform 25 is capable of moving in opposite directions left and right as shown by the doubleheaded arrow 27. On the other hand, the vise platform 26 is capable of moving in the forward and backward direction as shown by the doubleheaded arrow 28. Thus, the vise platform 26 moves along with the main platform 25 and is slaved thereto. To this end the vise platform 26 may have a projecting tongue 30 engaging a corresponding groove 31 in the main platform 25 as illustrated in FIG. 1a. This arrangement permits the vise platform 26 to move in a forward and backward direction on the platform 25 while the main platform moves left and right.

The vise 23 has a forward, fixed portion or jaw 32 and a rear portion or jaw 33 which is movable for opening and closing the vise. To this end there may be provided a bellows 34 fixed to the vise platform 26 and actuated by air pressure which may enter the air tube 35. Thus, under the influence of the air pressure the bellows 34 may be elongated to push a rod 36 fixed to the rear vise jaw 33 so that the vise may be opened and closed as indicated by the double-headed arrow 37.

The main platform 25 is moved to the left and right by means of an air cylinder 38 which may be fixed as shown. The air cylinder 38 is provided with an internal piston 40 connected to a connecting rod 41 which in turn is secured to the main platform 25. Air pressure may be fed to an air tube 42 into a distributor box 43 which may be controlled by a solenoid valve 44. Accordingly, dependin upon the position of the solenoid valve 44, air is forced through one or the other of the air ducts 45 and 46 to the right-hand side or left-hand side of the piston 40 thereby to move the main platform 25 either to the left or to the right.

The action of the air cylinder 38 and piston 40 is quite powerful and moves the main platform 25 very fast. Therefore, it may be desirable to reduce the speed of the platform 25. To this end there may be provided an oil damping system including an oil cylinder 47 within which a piston 48 is movable. The piston 48 is connected to a connecting rod 50 which in turn is secured to the platform 25. The cylinder 47 may be filled with a suitable liquid such as oil which is permitted to flow from one end of the cylinder 47 to the other through a U-shaped tube 51 including an adjustable metering valve 52. Thus, by opening or closing the passage for the damping oil the permissible speed of movement of the platform 50 may be increased or decreased.

The vise platform 26 may also be moved in the same manner as is the main platform 25. To this end there may be provided again an air cylinder 53 operating in the same manner as the air cylinder 38 and provided with an air distribution box 54, a solenoid valve 55 and an air inlet tube 56. Accordingly, the connecting rod 57, fixed to the vise platform 26, moves the vise platform forward and back depending on the position of the solenoid valve 55.

Similarly, the movement of the vise platform 26 may be damped by an oil damping system including an oil cylinder 58 operating in a like manner as the oil cylinder 47 previously described. The connecting rod 59 is fixed to the vise platform. By means of the metering valve 60, the motion of the vise platform 26 may be controlled.

Since the vise platform 26 moves toward the left and right in unison with the main platform 25, the air cylinder 53 may be tied to the main platform 25 by a suitable bracket 61. Similarly, a bracket 62 may be provided for securing the oil cylinder 58 to the main platform 25.

The piece of stock 20, in this example, clamped between the vise jaws 32 and 33 is to be deburred or chamfered on both ends by a suitable tool. To this end there may be provided a right-hand gear motor 65 connected to a gear box 66 for driving a drive shaft 67 connected to a flexible coupling 68 which in turn has a shaft 70 extending through a suitable bearing block 71 and which in turn drives the deburring or chamfering tool 72. The bearing block 71 may be provided with brackets 73 for fixing it with respect to the movable platforms 25 and 26. The deburring or chamfering tool 72 is arranged to be continuously rotating and fixed in space.

A similar arrangement is provided for the left-hand tool 75 which is driven by a gear motor 78 through fixed bearing block 80.

Thus, it will be seen when the vise platform 26 is in the position of FIG. 1 and when the main platform 25 moves toward the left, the open left-hand end of the stock 20 engages the left-hand deburring tool 75 for deburring it. It will, therefore, be appreciated that the main platform must move slowly and gently at the end of its travel so as not to damage either the stock or the deburring tool 25. To this end there may be provided an additional braking system which may be a fluid system operating against air pressure.

Accordingly, there is provided a bumper head 82 to brake movement of the main platform toward the right. The bumper head 82 extends into an oil cylinder 83 and has a piston 84 therein. Thus, when the main platform 25 engages the bumper head 82 the piston 84 will be displaced toward the right and the damping fluid such, for example, as oil is forced out of the cylinder 83 into a tube 85 and past a metering valve 86 into a liquid damping containing 87.

The metering valve 86 is so arranged that it restricts flow in the direction of arrow 88 thereby to slow down movement of the main platform 25 toward the right. Eventually, the damping oil is forced into the container 87 and against a head 90 of compressed air which is fed into the container through an air line 91.

The metering valve 86 is so arranged, however, that flow of the damping oil in a direction opposite arrow 88 is unrestricted; whereby as soon as the platform 25 moves again toward the left, the oil is immediately forced back into the cylinder 83 so that the bumper 82 resumes the position of FIG. 1, and is again ready to break movement of the main platform 25 toward the right.

Braking of the main platform 25 in the opposite direction takes place in the same manner. Thus, there is provided a bumper head 93 cooperating with an oil cylinder 94 connected by an oil line 95 and a metering valve 96 to the oil containing 87. The metering valve 96 operates in the same manner and restricts oil flow in the direction of arrow 97 while permitting restricted oil flow in the opposite direction.

In order to eject a finished piece of stock there may be provided an ejection nozzle 100 which is positioned forward of the deburring tools 72 and 75. Thus, when the vise platform 26 moves in the forward direction into alignment with the ejection nozzle 100 and after the rear jaw 33 of the vise has opened, the stock may be ejected by air pressure.

The main platform 25 may be provided with a right-hand step switch 101 and a lefthand stop switch 102. These switches respectively sense that the main platform has reached its extreme right-hand position or its extreme left-hand position. The switches 101 and 102 may form part of a programming system for initiating the next step in the cycle of operations.

Similarly, there may be provided a limit switch 103 for sensing the most forward limit of movement of the vise platform 26. An adjacent limit switch 104 may serve the purpose to control opening of the rear jaw 33 of the vise 23 in response to the vise platform having reached its foremost position.

Briefly, the system of FIG. 1 operates as follows. The rotary saw 15 is lowered into its cutting position as shown at 15' in dotted lines in FIG. 2 to sever a piece of stock 20 which then is received by the stock retaining tray 21. Next the vise platform 26 moves toward the rear below the tray 21 and the rear jaw 33 of the vise opens by releasing the air pressure and permitting the bellows 34 to contract. Then the next piece of stock drops into the open vise which subsequently closes by actuation of the bellows 34.

The vise platform 26 then moves into its operating position shown in FIG. 1 where the stock 20 is in alignment with the two deburring tools 72 and 73. The main platform 25 is next actuated to move toward the left. Due to the action of the oil braking system the main platform 25 is slowly eased into its most left-hand position whereby the rotating tool 75 engages the left-hand end of the tube 20. This is sensed by the limit switch 102 which then permits movement of the main platform 25 in the opposite direction. Again, the last portion of the movement is gently braked by the oil braking system until the right-hand end of the tube 20 engages the rotating tool 72.

The stock 20 being finished, the vise platform moves in a forward direction until the stock 20 is in alignment with the ejection nozzle 100. At this point, the tool limit switches 103 and 104 engage the vise platform to command opening of the vise by moving of the rear jaw 33 rearwardly and providing an air blast through the ejection nozzle 100 to blow the finished tube into a suitable storage tray.

Figure 8:
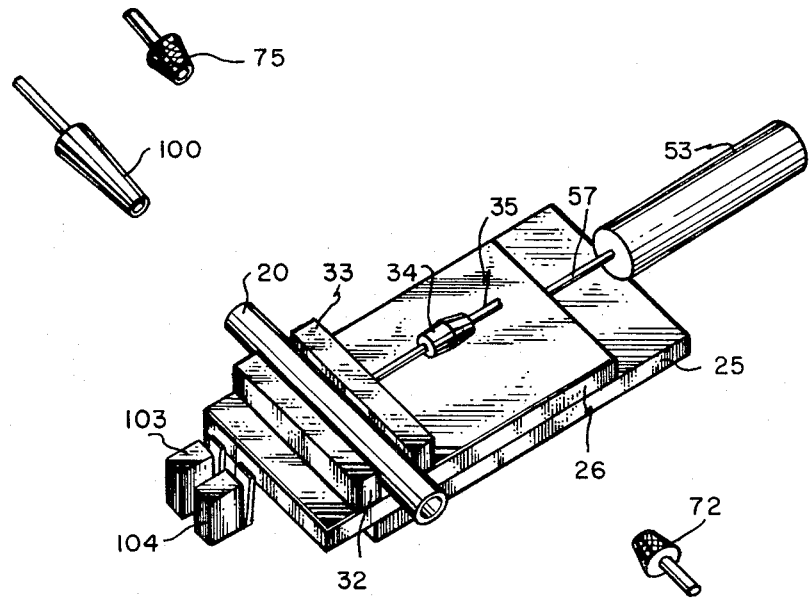
FIG. 8 is a view in perspective of the main and vise platforms with the finished tool preparatory to ejecting the finished tool by an ejection nozzle.

This will be subsequently explained in more detail in connection with FIGS. 6 and 8. However, before discussing in detail FIGS. 6 through 8, the stock metering mechanism will first be described by means of FIGS. 3 to 5 to which reference is now made.

Referring now to FIG. 3, there is illustrated the stock metering mechanism in a position preparatory to releasing a piece of stock into the vise 23. The position of the vise platform 26 corresponds to that assumed when the finished stock is ejected. In other words, it is to be assumed that the rear jaw 33 of the vise 23 has been retracted and the vise platform moved into a position so that the stock 20 may be ejected by the ejection nozzle 100.

The stock metering mechanism, among others, includes the stock retaining tray 21 which may be assumed to be filled with stock as shown. There is also provided a stock guide 110 which is fixed with respect to the platforms 25, 26. There is further provided a stock retainer shown generally at 111. This includes a rear wall 112 and a forward wall 113. The rear wall 112 is provided with an upper retaining pin 114 while the forward wall 113 is provided with a lower retaining pin 115. The stock retainer 111 is disposed in a guide 116 having a guide slot 117 and is thereby movable toward the left and right. The tube retainer 111 is urged toward the right of FIG. 3, that is, in the rearward direction by a spring 118 disposed in the guide 116 and bearing against the forward wall 113. This urges the tube retainer toward the right of FIG. 3, or in the rearward direction, against a stop pin 120.

The vise platform 26 then moves in a forward direction as shown by an arrow 121 until the forward or fixed vise jaw 32 engages an adjustable stop screw 122. This has been shown in FIG. 4 to which reference is now made.

Figure 4:
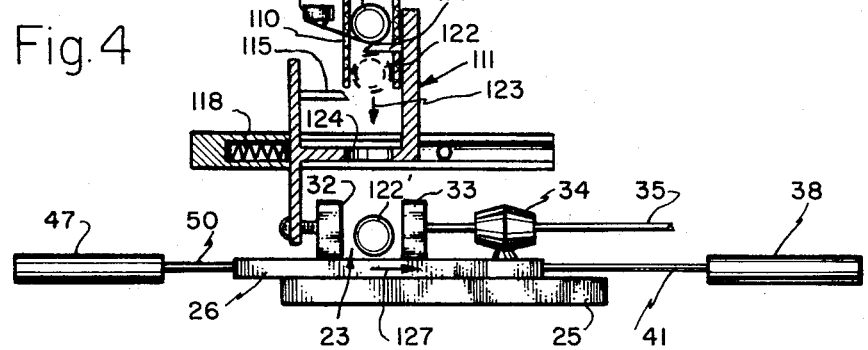
FIG. 4 is a side elevational view, partly in section, similar to that of FIG. 3 but illustrating the stock metering mechanism in a position while the lowermost piece of stock is being released into the vise which has moved into a forward position.

As illustrated in FIG. 4, the forward movement of the vise platform 26 pushes the tube retainer 111 toward the left thus compressing spring 118. As a result, the lower retaining pin 115 moves out of the way of the lower piece of stock 122 which drops downwardly as shown by an arrow 123 through a suitable slot 124 in the tube retainer 111 into the vise 23 and assumes a position shown at 122'.

At the same time, the upper retaining pin 114 moves toward the left and below the upper piece of stock 125 which is thereby prevented from dropping down the fixed tube guide 110. A switch 126 may be positioned to sense the presence of a piece of stock 125 above the upper retaining pin 114.

Thus, one piece of stock 122' is metered by the metering mechanism and drops into the space of the open jaw 23. After this has been accomplished the vise platform 25 moves in the direction of an arrow 127 toward the right of FIG. 4 or in a rearward direction. At the same time the rear vise jaw 33 closes to clamp the stock 122'. The final position of the metering mechanism is shown in FIG. 5 to which reference is now made.

Figure 5:
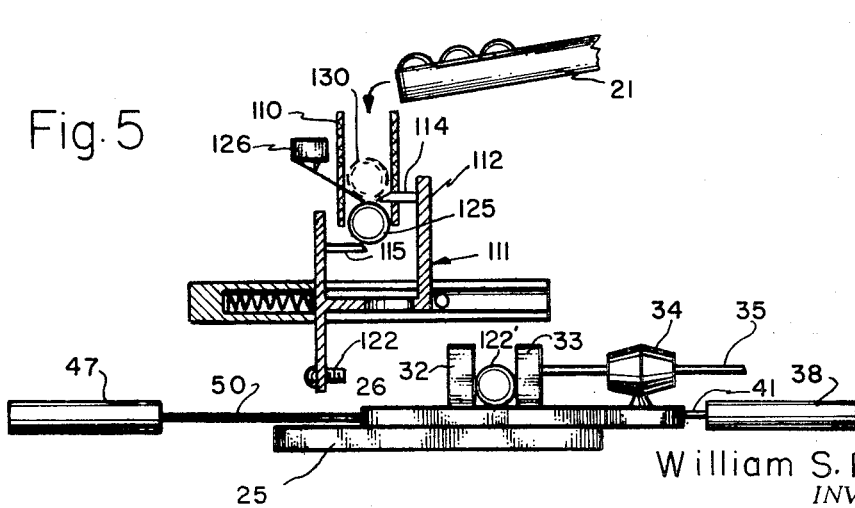
FIG. 5 is a side elevational view, partly in section, similar to that of FIGS. 3 and 4 but illustrating the stock metering mechanism in a position where the upper piece of stock has moved into a lower position prior to its release while a new piece of stock is ready to drop into the fixed stock guide, while the vise platform has moved away from the mechanism, the vise being in the closed position.

The vise platform 26 has moved to its outermost rear position, that is, toward the right as shown in FIG. 5. The rear jaw 33 of the vise platform has been pushed toward the left to lock the piece of stock 122' between the jaws 32 and 33. The vise platform 26 is now in such a position that the stock 122' is in alignment with the rotary tools 72 and 75 of FIG. 1.

At the same time the tube retainer 111 has been released again because the rear jaw 32 of the vise has disengaged the adjustable stop screw 122. This has caused movement of the righthand wall 112 toward the right so that the upper retaining pin 114 has moved out of engagement with the piece of stock 125 which is thereby permitted to drop down. However, it is held by the lower retaining pin 115 which has moved also toward the right under the stock 125. Accordingly, the piece of stock 125 is then in the position of the piece of stock 122 in FIG. 3. A new piece of stock 130 is then ready to drop into the fixed tube guide 110. Accordingly, the cycle of operation can repeat again.

Thus, it will be seen that the successive reciprocating movements of the vise platform 26 first towards the left and then toward the right will release the lower piece of stock in the fixed tube guide 110 and permit it to drop down into the open vise. When the vise platform returns again the upper piece of stock is permitted to assume the empty position of the former lower piece of stock and a new piece of stock is permitted to drop into the tube guide 110. The main purpose of the switch 126 is to sense the presence of a new piece of stock in the upper position. In the absence of such a piece of stock the switch is not engaged and the apparatus may be so programmed as to shut down until another piece of elongated stock may be put into position to be severed by the rotary saw.

Having described the metering of the stock piece by piece into the vise, reference is now made to FIGS. 6 and 7 which illustrate how the stock is being treated.

Thus, FIG. 6 illustrates the stock 20 being clamped in the vise 23 as previously described. The main platform 25 has moved in a leftward direction as shown in FIGS. 1 and 6 until the stock 20 is engaged by the tool 75 such as chamfering or deburring tool. It has previously been described how the main platform 25 is moved and how its movement is gently braked so as to move the stock 20 slowly into the cutting tool 75 without damage to either.

The limit switch 102 senses when the main platform 25 has reached its outermost left-hand position. The system may then be programmed to reverse movement of the platform 25 to move it into the position shown in FIG. 7.

Here the platform 25 is in its outermost right-hand position so that the right-hand end of the stock 20 engages the chambering tool 72. In this case, the limit switch 101 senses the extreme right-hand position of the main platform 25 to signal that the next step in the cycle of operation may begin.

Accordingly, the main platform 25 returns to its normal or central position shown in FIG. 1. Subsequently, the vise platform 26 moves in a forward direction as shown in FIG. 8 until the stock 20 is in alignment with the ejection nozzle 100. This is sensed by the limit switches 103 and 104. One of these, such as the switch 104, will give the signal to retreat the rear jaw 33 of the vise by relieving the air pressure on the bellows 34. This will open the vise and at the same time an air blast through the ejection nozzle 100 will blow out the finished piece of stock 20 into a suitable bin or the like. As clearly shown in FIGS. 1 and 8, the ejection nozzle 100 is mounted forward of the rotary tools 72 and 75 so that the stock may be blown out after forward movement of the vise platform 26. Subsequently, the vise platform 26 moves again forward a small distance into the position of FIG. 4 to receive a new piece of stock.

It will be realized that the treatment of a piece of stock and the loading of a new piece of stock must be accomplished in real time. This means that an entire cycle of operation must take place in the time the raw stock 16 is advanced and another piece of stock such as 20 is cut off by the saw blade 15.

It has been pointed out above that the system of the present invention is not limited to the treatment of tube stock but may be used as well for treating bar stock or rods. This has been shown in FIG. 9 to which reference is now made. Here a piece of rod stock 130 is clamped between the jaws 32 and 33 of the vise on the vise platform 26. The rod stock 130 has been severed in the manner previously described. Since the stock has been cut by a rotary saw it has burrs or sharp edges on its outer surface. These may be deburred by a deburring tool 131 which may be driven by the gear motor 65 and reduction gear 66 through the drive shaft 70 mounted in the bearing block 71, all as previously described in connection with FIG. 1. Thus, when the main platform 25 moves in a right-hand direction the rod stock 130 engages the deburring tool 131.

Similarly, there may be a deburring tool 132 mounted on the opposite side of the bar stock 130. In addition, the deburring tool 131 may be provided with a drill 133 to drill a hole into the rod stock if that should be desired. Similarly, the deburring tool 132 on the left-hand side of the vise platform 26 may be provided with a similar drill 134.

Thus, it will be appreciated that by simply exchanging tools the same system may be used for treating not only tubes but also bar or rod stock. The stock may be deburred, chamfered, drilled or counter-bored as the case may be.

Figure 10:
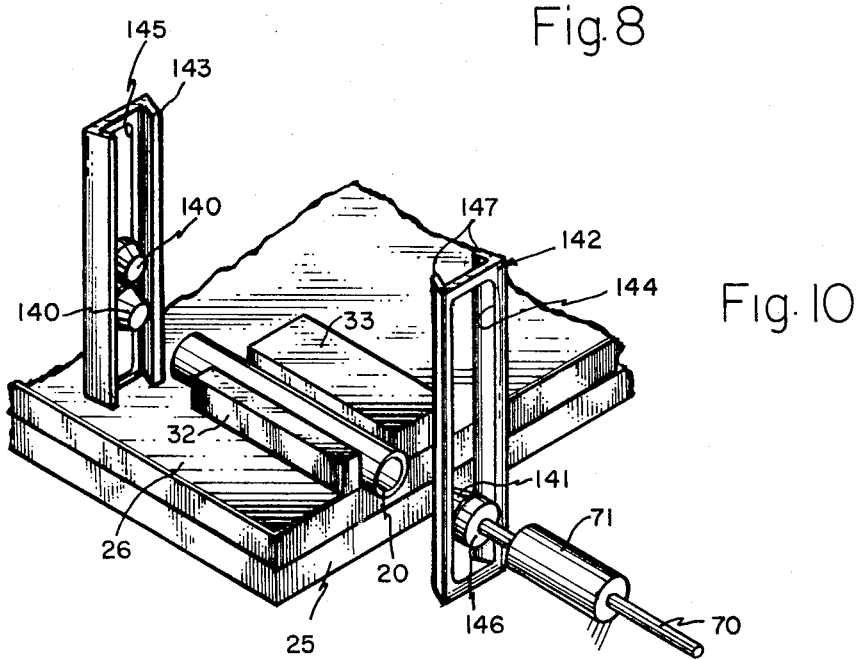
FIG. 10 is a view in perspective similar to that of FIG. 9 but showing a tube with a pair of guides for two sets of end caps and fixed bumpers for pressing successively an end cap into each opposed end of the tube stock.

Finally, instead of treating the stock 20 with a rotary tool it is also feasible to provide the stock with a suitable end cap or protective plug or the like. This has been illustrated in FIG. 10 to which reference is now made.

Here, for example, a plurality of caps such as shown at 140 and 141 are provided on opposite sides of a piece of tube stock 20 clamped between the vise jaws 32 and 33 and the vise platform 26. The caps 140 and 141 are disposed in suitable guides 142 and 143, each being provided with a suitable rectangular opening 144 or 145 to permit mounting of the caps on the piece of tube stock 20. To this end there may be provided a fixed bumper head 146 disposed on the bearing block 71. It will be understood that in this case the bumper head 146 is stationary, that is, non-rotating. Thus, as the main platform 25 is moved toward the right the tube 20 is pressed against the bumper head 146 so that the cap 141 is forced into the opening of the tube. Preferably, the guide 142 is provided with two retaining portions 147 facing the stock and slightly inclined toward each other so as to retain the caps 140 and 141. However, the guide portions 147 are relatively elastic so as to release the cap when the main platform 25 moves in the opposite direction.

It will be understood that a similar bumper head (not shown) will be disposed on the left-hand side of the platform in cooperation with the caps 140 so that the tube stock may be provided with such caps or protective plugs on both sides thereof.

There has thus been disclosed an automatic system for treating elongated stock such as tubes, bars, and rods. The system includes a mechanism for metering on demand, one by one, severed pieces of stock for further treatment. The metering mechanism includes a movable tube retainer structure cooperating with a movable vise platform which thereby releases the stock one by one. Each piece of stock is then secured in a vise and moved in succession against one and then another of opposite, rotating tools for treating the ends of the stock. After the stock has been finished the vise platform moves it in alignment with an ejection nozzle which then ejects the finished piece whereupon a new piece of stock is automatically dropped into the open vise to start the next cycle of operations. Various switches are provided to sense the presence of the material as well as the positions of the main and vise platforms. The whole system may be made inoperative in response to the lack of a piece of stock in the fixed tube guide.

I claim:

1. An automatic system for treating elongated, severed pieces of stock such as tubes, rods and bars, said system comprising:
    a. platform means adapted to move in two directions at right angles to each other;
    b. vise means for holding a piece of stock, said vise means being fixed to said platform means and capable of opening and closing for releasing or retaining the stock;
    c. means for feeding a piece of stock into said vise means and for subsequently closing said vise means;
    d. tool mechanism disposed in the path of movement of said platform means;
    e. means for moving said platform means so that at least one end of the stock engages said tool mechanism; and
    f. means for subsequently moving said platform means, opening said vise means and ejecting the finished stock therefrom.

2. A system as defined in claim 1 wherein said tool mechanism includes a pair of tool means disposed opposite each other, and wherein said means for moving said platform means move said platform means so that one end of the stock engages first one of said tool means and then the other end of the stock engages the other one of said tool means.

3. A system as defined in claim 2 wherein said platform means comprises a main platform and a vise platform, said main platform being adapted to move in one direction together with said vise platform and said vise platform being adapted to move at right angles to the first direction for receiving the stock, moving it opposite said tool means and then into a stock eject position, and said main platform being adapted to move the stock in said vise means first adjacent one of the tool means and then the other.

4. A system as defined in claim 2 for treating tubes, wherein at least one of said tool means comprises a chamfering tool, and means for continuously rotating said tool.

5. A system as defined in claim 1 wherein said means for ejecting the stock includes an air nozzle.

6. A system as defined in claim 2 for treating rods, and wherein at least one of said tool means comprises a deburring tool and a drill, and means for continuously rotating said tool and drill.

7. A system as defined in claim 2 for treating tubes, and wherein at least one of said tool means comprise a fixed bumper, and cap-like elements disposed between the stock and said bumper for forcing one of said elements into an end of said tube.

8. An automatic system for treating elongated, severed pieces of stock such as tubes, rods, and bars, said system comprising:
    a. a main platform adapted to reciprocate in opposite directions;
    b. a vise platform slidably disposed on said main platform for movement in opposite directions and at right angles to said main platform;
    c. vise means for holding the stock fixed to said vise platform and capable of opening and closing for receiving, holding and releasing the stock;
    d. means for feeding a piece of stock into the open vise means and for subsequently closing said vise means;
    e. a pair of tool means fixed with respect to and disposed opposite to each other on a common axis and in the path of movement of said main platform for engaging successively one and then the other one of the ends of the stock;
    f. means for moving said vise platform until the stock is in alignment with said tool means and for successively moving said main platform until one of said tool means is in engagement with one end of the stock and subsequently until the other tool means is in engagement with the other end of the stock;
    g. means for subsequently ejecting the stock from said vise means; and
    h. means for moving said vise platform until the stock is in engagement with said ejecting means for ejecting the finished stock from the open vise means.

9. A system as defined in claim 8 wherein said means for moving said main platform and for moving said vise platform includes a gas-pressure-actuated device for each of said platforms, and a fluid damping device for each of said platforms for damping the movement thereof, said devices being constructed to the respective platforms.

10. A system as defined in claim 9 wherein additional hydraulic damping means are providing for damping the movement of said main platform at either end of its travel, thereby to ease movement of the stock into engagement with the respective tool means.

11. A system as defined in claim 9 wherein said fluid damping device is provided with controllable valve means for controlling the speed of movement of each of said platforms.

12. A system as defined in claim 10 wherein controllable valve means is coupled to said hydraulic damping means for controlling the speed of movement of said main platform toward the end of its travel.

13. A system as defined in claim 8 wherein said means for feeding the stock into said vise means includes a stock release mechanism coupled to and controlled by movement of said vise platform for releasing a piece of stock into the open vise means and for permitting at the same time a new piece of stock to be received and retained thereby.

* * * * *